(12) United States Patent
Dickerson et al.

(10) Patent No.: US 11,807,583 B2
(45) Date of Patent: Nov. 7, 2023

(54) PRECERAMIC POLYMER GRAFTED NANOPARTICLES AND METHODS OF MAKING AND USING SAME

(71) Applicant: Government of the United States, as represented by the Secretary of the Air Force, Wright-Patterson AFB, OH (US)

(72) Inventors: Matthew B. Dickerson, Beavercreek, OH (US); Kara L. Martin, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 368 days.

(21) Appl. No.: 17/114,628

(22) Filed: Dec. 8, 2020

(65) Prior Publication Data
US 2021/0230072 A1 Jul. 29, 2021

Related U.S. Application Data

(60) Provisional application No. 62/965,323, filed on Jan. 24, 2020, provisional application No. 62/965,184, filed on Jan. 24, 2020.

(51) Int. Cl.
*C04B 35/589* (2006.01)
*C04B 35/571* (2006.01)
(Continued)

(52) U.S. Cl.
CPC ........ *C04B 35/589* (2013.01); *C04B 35/571* (2013.01); *C04B 35/626* (2013.01);
(Continued)

(58) Field of Classification Search
None
See application file for complete search history.

(56) References Cited

U.S. PATENT DOCUMENTS 4,604,367 A * 8/1986 Takamizawa ......... C04B 35/571
501/88
5,283,044 A 2/1994 Okamura et al.
(Continued)

OTHER PUBLICATIONS

Tang, C.; Bombalski, L.; Kruk, M.; Jaroniec, M.; Matyjaszewski, K.; Kowalewski, T.; "Nanoporous Carbon Films from "Hairy" Polyacrylonitrile-Grafted Colloidal Silica Nanoparticles", Advanced Materials, 2008, 20, 1516-1522.
(Continued)

*Primary Examiner* — Jeffrey D Washville
(74) *Attorney, Agent, or Firm* — AFMCLO/JAZ; James F. McBride

(57) ABSTRACT

The present invention relates to preceramic polymer grafted nanoparticles and as well as methods of making and using same. Advantages of such preceramic polymer grafted nanoparticles include, reduced out gassing, desired morphology control and desirable, distinct rheological properties that are not found in simple mixtures. As a result, Applicants' preceramic polymer grafted nanoparticles can be used to provide significantly improved, items including but not limited to hypersonic vehicles, jets, rockets, mirrors, signal apertures, furnaces, glow plugs, brakes, and armor.

11 Claims, 4 Drawing Sheets

(51) Int. Cl.
    *C04B 35/626*     (2006.01)
    *C04B 35/628*     (2006.01)
    *B82Y 30/00*     (2011.01)
    *B82Y 40/00*     (2011.01)

(52) U.S. Cl.
    CPC ............ *C04B 35/628* (2013.01); *B82Y 30/00* (2013.01); *B82Y 40/00* (2013.01); *C04B 2235/3813* (2013.01); *C04B 2235/3826* (2013.01); *C04B 2235/3873* (2013.01); *C04B 2235/3886* (2013.01); *C04B 2235/5454* (2013.01); *C04B 2235/60* (2013.01)

(56) References Cited

U.S. PATENT DOCUMENTS

| | | | |
|---|---|---|---|
| 5,783,139 | A | 7/1998 | Curran |
| 6,673,402 | B2 | 1/2004 | Wildenrotter et al. |
| 6,735,842 | B1 | 5/2004 | Wildenrotter et al. |
| 7,012,035 | B2 | 3/2006 | Muhlratzer |
| 7,628,942 | B1 | 12/2009 | Miller et al. |
| 8,859,037 | B2 | 10/2014 | Stout et al. |
| 10,174,801 | B2 | 1/2019 | Im et al. |
| 10,300,624 | B2 | 5/2019 | Schmidt |
| 10,408,997 | B1 | 9/2019 | Eckel et al. |
| 10,478,996 | B1 | 11/2019 | Edwards et al. |
| 2017/0233300 | A1 | 8/2017 | Raj |

OTHER PUBLICATIONS

Che, J.; Park, K.; Grabowski, C. A.; Jawaid, A.; Kelley, J.; Koerner, H.; Vaia, R. A.; "Preparation of Ordered Monolayers of Polymer Grafted Nanoparticles: Impact of Architecture, Concentration, and Substrate Surface Energy", Macromolecules, 2016, 49, 1834-1847.

Vowinkel, S.; Boehma, A.; Schäfer, T.; Gutmann, T.; Ionescuc, E.; Galleia, M.; "Preceramic core-shell particles for the preparation of hybrid colloidal crystal films by melt-shear organization and conversion into porous ceramics", Materials and Design, 2018, 160, 926-935.

Choudhury, S.; Agrawal, A.; Kim, S.A.; Archer L.A.; "Self-Suspended Suspensions of Covalently Grafted Hairy Nanoparticles," Langmuir, 2015, 31, 3222-3231.

Gallei, M.; Li, J.; Elbert, J.; Mazurowski, M.; Schönberger, A.; Schmidt, C.; Stühn, B.; Rehahn, M.; Immobilization of Poly(1,1-dimethysilacyclobutane) by Means of Anionic Ring-Opening Polymerization on Organic Nanoparticles and Reinvestigation of Crystallization. Polymers, 2013, 5 (1), 284-302.

Elbert, J.; Didzoleit, H.; Fasel, C.; Ionescu, E.; Riedel, R.; Stühn, B.; Gallei, M.; Surface-Initiated Anionic Polymerization of [1]Silaferrocenophanes for the Preparation of Colloidal Preceramic Materials. Macromol. Rapid Commun., 2015, 36, 597-603.

Dasan, A.; Lucas, R.; Laborde, E.; Piriou, C.; Foucaud, S.; Towards a surface functionalisation and grafting of a polycarbosilane onto zirconium carbide particles for the development of hybrid core-shell structures. Applied Surface Science, 2019, 495, 143409, 1-8.

Choueiri, R. M.; Klinkova, A.; Pearce, S.; Manners, I.; Kumacheva, E.; Self-Assembly and Surface Patterning of Polyferrocenylsilane-Functionalized Gold Nanoparticles. Macromol. Rapid Commun., 2018, 39, 1700554, 1-6.

\* cited by examiner

PRECERAMIC POLYMER GRAFTED NANOPARTICLES AND METHODS OF MAKING AND USING SAME

CROSS-REFERENCE TO RELATED APPLICATIONS

The present application claims priority to U.S. Provisional Application Ser. No. 62/965,323 filed Jan. 24, 2020, and U.S. Provisional Application Ser. No. 62/965,184 filed Jan. 24, 2020, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to preceramic polymer grafted nanoparticles and as well as methods of making and using same.

BACKGROUND OF THE INVENTION

Preceramic polymers are valuable materials as they are used as coatings and as components of other materials such fibers, bulk monolithic ceramics, composites, resins for additive manufacturing. Unfortunately, when current preceramic polymers are used and/or processed into the aforementioned materials, they exhibit undesirable porosity, cracking and out gassing which requires additional processing steps to remedy. In addition, such issues limit the thickness of materials that can be made from such preceramic polymers. Furthermore, current preceramic polymers do not offer the range of chemistries/chemical compositions needed for all potential applications.

Applicants recognized that the source of the aforementioned problems was that the excess shrinkage and the instability of the materials used to make current preceramic polymers. Applicants discovered that by properly combining a preceramic polymer with an inorganic core the aforementioned shrinkage problem minimized and instable raw materials need not be used, yet all the desired advantages could be obtained. Such advantages include, reduced out gassing, desired morphology control and desirable, distinct rheological properties that are not found in simple mixtures can be obtained. As a result, Applicants' preceramic polymer grafted nanoparticles can be used to provide significantly improved, items including but not limited to hypersonic vehicles, jets, rockets, mirrors, signal apertures, furnaces, glow plugs, brakes, and armor.

SUMMARY

The present invention relates to preceramic polymer grafted nanoparticles and as well as methods of making and using same. Advantages of such preceramic polymer grafted nanoparticles include, reduced out gassing, desired morphology control and desirable, distinct rheological properties that are not found in simple mixtures. As a result, Applicants' preceramic polymer grafted nanoparticles can be used to provide significantly improved, items including but not limited to hypersonic vehicles, jets, rockets, mirrors, signal apertures, furnaces, glow plugs, brakes, and armor.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1A:
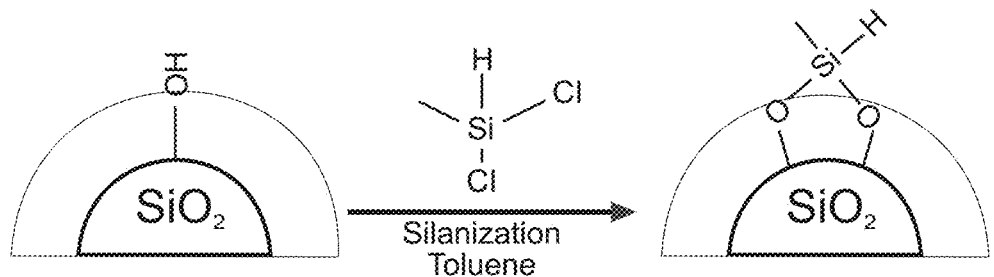
FIG. 1A shows an illustration (left) of the silica functionalization.
Figure 1B:
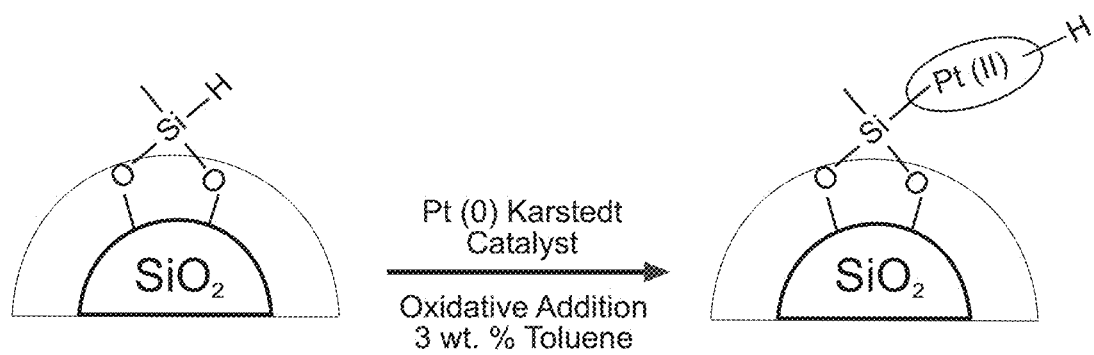
FIG. 1B depicts metal catalyst anchoring.
Figure 1C:
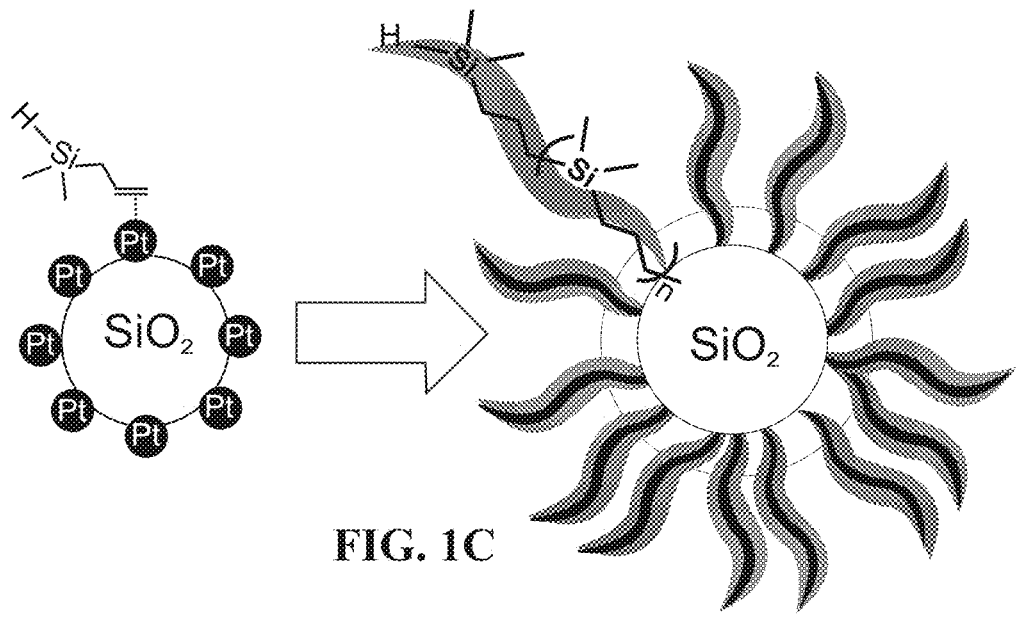
FIG. 1C depicts the growing of the preceramic 1-PCS brush from the silica surface
Figure 1D:
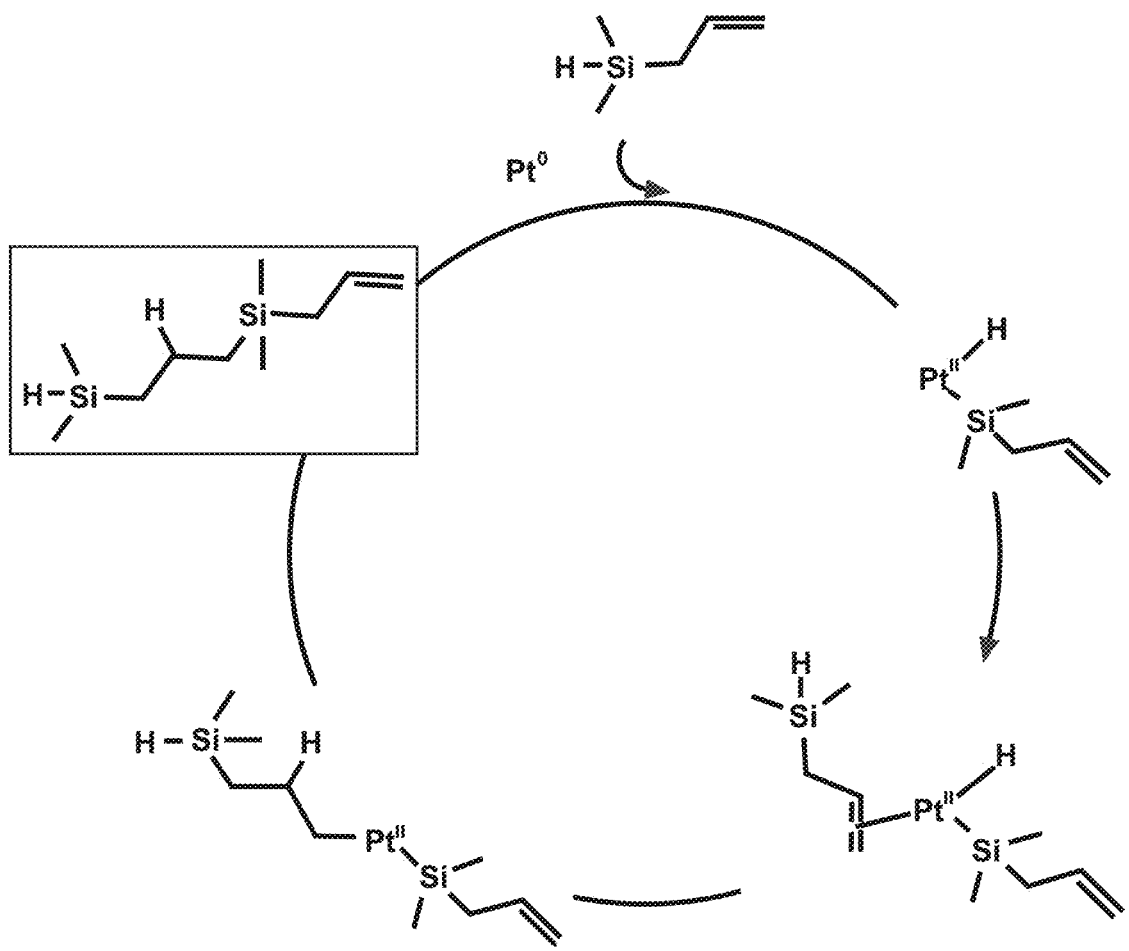
FIG. 1D depicts a schematic of the Pt(0)-catalyzed hydrosilylation mechanism.
Figure 2A:
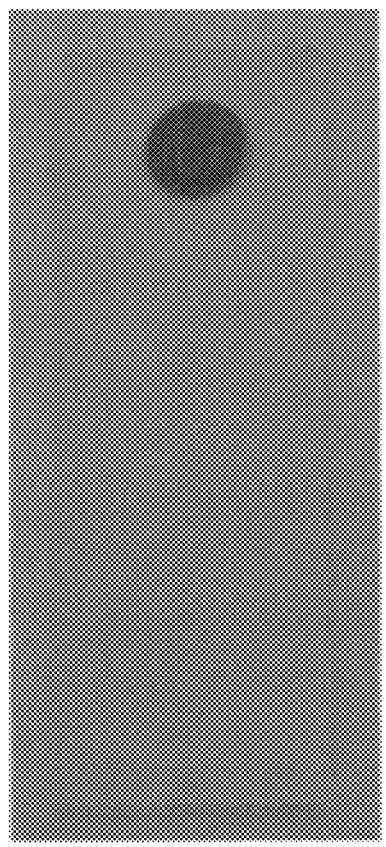
FIG. 2A is an image of a neat 72-preceramic polymer grafted nanoparticle dropped on a glass slide.
Figure 2B:
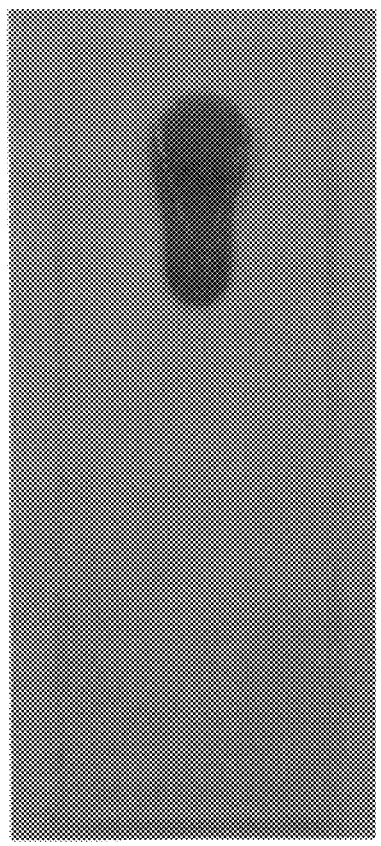
FIG. 2B is an image of the neat 72-preceramic polymer grafted nanoparticle dropped on a glass slide of FIG. 2A after tilting the glass slide perpendicular to the floor.
Figure 3A:
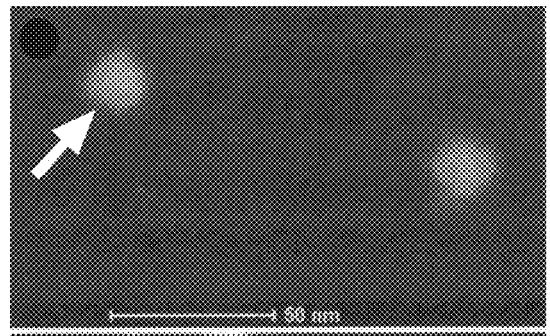
FIG. 3A is single particle images showing coma completely surrounding the particle.
Figure 3B:
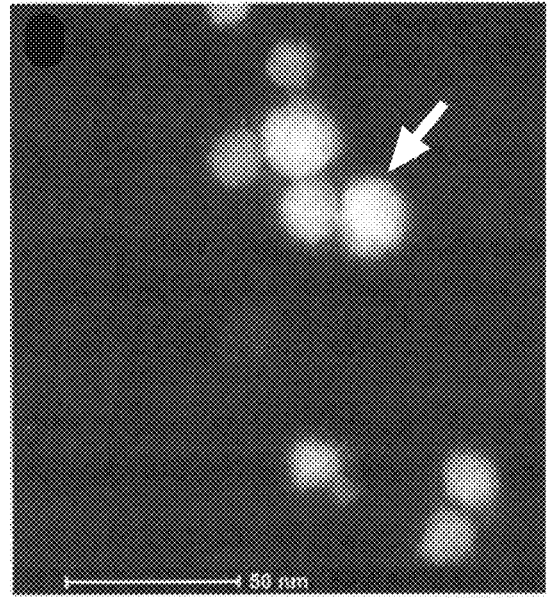
FIG. 3B is a STEM imaging of the 72-preceramic polymer grafted nanoparticle (g, h).
Figure 3C:
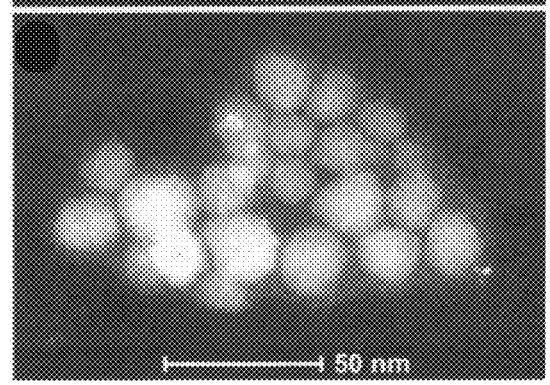
FIG. 3C is an image of a 48 preceramic polymer grafted nanoparticle showing a dense corona surrounding silica nanoparticles.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Preceramic Polymer Grafted Nanoparticles, Materials Comprising Preceramic Polymer Grafted Nanoparticles, Articles and Finished Articles Comprising Same Applicants disclose a preceramic polymer grafted nanoparticle comprising a core having an outer surface and maximum dimension in any single direction of 5 microns, preferably said core having a maximum dimension in any single direction of 1 micron, more preferably said core having a maximum dimension in any single direction of 100 nanometers, most preferably said core having a maximum dimension in any single direction of 2 nanometers to 30 nanometers and a plurality of polymers covalently bound to the outer surface of said core, said plurality of polymers having an average brush length of from about 1 nanometer to about 100 nanometers, preferably, said plurality of polymers having an average brush length of from about 1 nanometer to about 50 nanometers, more preferably plurality of polymers having an average brush length of from about 5 nanometers to about 12 nanometers:
    a) said core comprising a material selected from the group consisting of Hydrogen, Lithium, Beryllium, Boron, Carbon, Nitrogen, Oxygen, Fluorine, Sodium, Magnesium, Aluminum, Silicon, Phosphorus, Sulfur, Chlorine, Potassium, Calcium, Scandium, Titanium, Vanadium, Chromium, Manganese, Iron, Cobalt, Nickel, Copper, Zinc, Gallium, Germanium, Arsenic, Selenium, Bromine, Strontium, Yttrium, Zirconium, Niobium, Molybdenum, Technetium, Ruthenium, Rhodium, Palladium, Silver, Cadmium, Indium, Tin, Antimony, Tellurium, Iodine, Cesium, Barium, Lanthanum, Cerium, Praseodymium, Neodymium, Promethium, Samarium, Europium, Gadolinium, Terbium, Dysprosium, Holmium, Erbium, Thulium, Ytterbium, Lutetium, Hafnium, Tantalum, Tungsten, Rhenium, Osmium, Iridium, Platinum, Gold, Mercury, Thallium, Lead, Bismuth, Polonium, Radium, Actinium, Thorium, Protactinium, Uranium, *Neptunium*, Plutonium, Americium, and mixtures thereof, preferably said core comprises a ceramic, more preferably said core comprises a nonoxide ceramic, most preferably said core comprises SiC, ZrC, HfC, $Si_3N_4$, ZrN, HfN, $ZrB_2$, $HfB_2$, and mixtures thereof; and
    b) said plurality of polymers being a polycarbosilane, preferably said polycarbosilane being selected from the group consisting of poly(1,1-dimethylpropylsilane), poly(1,1-dichloropropylsilane), poly(1,1-diallylpropylsilane), poly(1,1dihydropropylsilane), poly(1,1-dimethylethylsilane), poly(1,1-dichloroethylsilane), poly(1,1diallylethylsilane), poly(1,1dihydroethylsilane), poly(1,1,3,3-tetramethyl-1,3-disilylbutane), poly(1,1,3,3-tetrachloro-1,3-disilylbutane), poly(1,1,3,3-tetraallyl-1,3-disilylbutane), poly(1,1,3,3-tetrahydro-1,3-disilylbutane), and copolymers of poly(1,1-dimethylpropylsilane), poly(1,1-dimethylethylsilane), poly(1,1-dichloropropylsilane), poly(1,1-dichloroethylsilane), poly(1,1,3,3-tetramethyl-1,3-disilylbutane), poly(1,1,3,3-tetrachloro-1,3-disilylbutane) and mixtures thereof.

Applicants disclose materials comprising a preceramic polymer grafted nanoparticle according to Paragraph 0023, said material being selected from the group consisting of a fiber, a bulk monolithic ceramic, a composite and a resin Applicants disclose articles comprising a material according Paragraph 0024, said article being selected from the group consisting of a brake pad, brake rotor, turbine combustor liner, turbine vane, turbine shroud, turbine blade, turbine bladed disc, flap, seal, aeroshell, leading edge, flame holder, exhaust structure, flowpath component, air inlet, compressor blade, isolator, fastener, signal aperture, window, combustion chamber, mixing vessel, nuclear fuel cladding, nuclear fuel coating, cutting tool, ballistic protection armor, heat shield, heat exchanger, particulate filter, metal casting filter, crucible, mirror, heating element, catalyst support, rocket nozzle, high-temperature valve, chemical handling equipment, or furnace support.

Applicants disclose finished articles comprising a material according to Paragraph 0024, said finished article being selected from the group consisting of a turbine engine, scramjet, ramjet, combined cycle engine, rotating detonation engine, internal combustion engine, augmenter, rocket engine, automotive brake system, aerospace brake system, high-speed aircraft aeorshell, leading edge, missile, airplane, nuclear reactor, armor protection system, chemical reactor, chemical handling equipment, furnace, filter assembly, cutting tool, window, aperture, telescope, or satellite.

Applicants disclose finished articles comprising an article according to Paragraph 0025, said finished article being selected from the group consisting of a turbine engine, scramjet, ramjet, combined cycle engine, rotating detonation engine, internal combustion engine, augmenter, rocket engine, automotive brake system, aerospace brake system, high-speed aircraft aeorshell, leading edges, missile, airplane, nuclear reactor, armor protection system, chemical reactor, chemical handling equipment, furnace, filter assembly, cutting tool, window, aperture, telescope, or satellite.

The disclosed materials of Paragraph 0024 comprising the preceramic polymer grafted nanoparticles according to Paragraph 0023 as well as the articles and finished articles disclosed in Paragraphs 0025 through 0027 can be made, for example by the processes disclosed in the following US Patents: The polycarbosilane listed in 5,283,044 (e.g., Example 1 from 5,283,044: polycarbosilane having a number-average molecular weight of 2000 and an oxygen content of 0.3% by weight) can be replaced with the preceramic polymer grafted nanoparticles according to Paragraph 0023 (i.e., such material is the raw material feedstock to spin the fibers). Other processing steps listed in 5,283,044 can be amenable to fibers spun from our materials. The organoborosilicon polymer listed in 4,604,367 (e.g., Example 1 from 4,604,367: The resinous material thus freed from low-molecular constituents had a melting point of 172.degree. to 184.degree. C. and a number-average molecular weight of 2230 and the results of the elementary analysis for silicon and boron indicated that the molar ratio of silicon to boron was about 13:1.) such material is replaced with the preceramic polymer grafted nanoparticles according to Paragraph 0023 (i.e., our material is the raw material feedstock to spin the fibers). Other processing steps listed in 4,604,367 can be amenable to fibers spun from our materials. U.S. Pat. No. 5,783,139 Here, the preceramic polymer grafted nanoparticles according to Paragraph 0023 can replace the organo-metallic ceramic precursors dicyclopentadienyl titanium dichloride and cyclopentadienyl titanium borohydride. This is fairly straight forward as the polymer carrier serves as the spinnable polymer, and the organometallic ceramic precursors are dissolved within the polymer. U.S. Pat. No. 8,859,037. Here, the preceramic polymer grafted nanoparticles according to Paragraph 0023 can replace the pre-ceramic polymer or slurry of SiC powder and liquid polymer precursor, as described in Claims 8 and 11 of U.S. Pat. Nos. 8,859,037, 7,012,035. Here, the preceramic polymer grafted nanoparticles according to Paragraph 0023 can replace the silicon-organic polymer. U.S. Pat. No. 6,673,402. Here, the preceramic polymer grafted nanoparticles according to Paragraph 0023 can replace the polycarbosilane resin. US20170233300 A1. Here, the preceramic polymer grafted nanoparticles according to Paragraph 0022 can replace the polymer precursor and mixed metal-alkoxides and particles. U.S. Pat. No. 10,300,624. Here, the preceramic polymer grafted nanoparticles according to Paragraph 0023 can replace the preceramic polymer and inorganic ceramic filler particles dispersed in the preceramic polymer. U.S. Pat. No. 10,408,997. Here, the preceramic polymer grafted nanoparticles according to Paragraph 0023 can replace photomonomer resin. In short, the processes of the aforementioned US patents may be used by the skilled artisan, without undue experimentation on such artisan's part, to make the disclosed materials of Paragraph 0024 as well as the articles and finished articles disclosed in Paragraphs 0025 through 0027 via replacing the materials used in such processes with the preceramic polymer grafted nanoparticles according to Paragraph 0023.

Processes of Making Preceramic Polymer Grafted Nanoparticles and Ceramics

Applicants disclose a process of making a preceramic polymer grafted nanoparticle comprising: combining a carbosilane monomer comprising at least one silane moiety and at least one vinyl moiety and/or a cyclic carbosilane monomer, preferably said carbosilane monomer is selected from the group consisting of allyldimethylsilane, vinyldimethylsilane, allyldichlorosilane, vinyldichlorosilane, 1,1,-dimethylsilylcyclobutane, 1,1-dichlorosilylcyclobutane, 1,1-dimethyldisilylcyclobutane, 1,1-dichlorodisilylcyclobutane and mixtures thereof with a core comprising a material selected from the group consisting of Hydrogen, Lithium, Beryllium, Boron, Carbon, Nitrogen, Oxygen, Fluorine, Sodium, Magnesium, Aluminum, Silicon, Phosphorus, Sulfur, Chlorine, Potassium, Calcium, Scandium, Titanium, Vanadium, Chromium, Manganese, Iron, Cobalt, Nickel, Copper, Zinc, Gallium, Germanium, Arsenic, Selenium, Bromine, Strontium, Yttrium, Zirconium, Niobium, Molybdenum, Technetium, Ruthenium, Rhodium, Palladium, Silver, Cadmium, Indium, Tin, Antimony, Tellurium, Iodine, Cesium, Barium, Lanthanum, Cerium, Praseodymium, Neodymium, Promethium, Samarium, Europium, Gadolinium, Terbium, Dysprosium, Holmium, Erbium, Thulium, Ytterbium, Lutetium, Hafnium, Tantalum, Tungsten, Rhenium, Osmium, Iridium, Platinum, Gold, Mercury, Thallium, Lead, Bismuth, Polonium, Radium, Actinium, Thorium, Protactinium, Uranium, *Neptunium*, Plutonium, Americium, and mixtures thereof, preferably said core comprises a ceramic, more preferably said core comprises a nonoxide ceramic, most preferably said core comprises SiC, ZrC, HfC, $Si_3N_4$, ZrN, HfN, $ZrB_2$, $HfB_2$, and mixtures thereof, said core having an outer surface, said outer surface being functionalized, preferably said functionalization comprising a silane moiety comprising a catalyst and/or a vinyl moiety comprising a catalyst, preferably said catalyst is a carbanion and/or platinum.

Applicants disclose a process according to Paragraph 0029, wherein said core and said monomer are combined and allowed to react for 1 hour to 168 hours, preferably said core and said monomer are combined and allowed to react for 24 hours to 72 hours at a temperature of from about 20° C. to 80° C., preferably at a temperature of from about 55° C. to 70° C. and a pressure of from about 0.1 atm to about 100 atm, preferably from about 0.5 atm to about 10 atm.

Applicants disclose a process according to Paragraphs 0029 through 0030 wherein said core's outer surface is functionalized by a process selected from silanization, phosphination; and/or sulfonization followed by oxidative addition of platinum to said silane moiety and/or reacting an alkyllithium with said vinyl moiety.

Applicants disclose a process method of making a ceramic comprising:
  a) crosslinking a mass of preceramic polymer grafted nanoparticle, said mass of preceramic polymer grafted nanoparticle comprising preceramic polymer grafted nanoparticles according to Paragraph 0023 and/or a preceramic polymer grafted nanoparticles produced according to Paragraph 0029 through Paragraph 0031, preferably said crosslinking comprises heat treating and or chemically treating said mass of preceramic polymer grafted nanoparticles by adding a crosslinker; and
  b) heat treating said crosslinked mass of preceramic polymer grafted nanoparticles in an inert gas, preferably said inert gases are selected from the group consisting of argon, nitrogen, hydrogen and/or helium, or under vacuum, preferably said vacuum is less than 0.1 Pascal's, preferably said heat treating comprises heating said crosslinked preceramic polymer grafted nanoparticles to a temperature of from about 600° C. to about 2700° C., preferably said heat treating comprises heating said crosslinked preceramic polymer grafted nanoparticles to a temperature of from about 600° C. to about 2000° C., more preferably said heat treating comprises heating said crosslinked preceramic polymer grafted nanoparticles to a temperature of from about 600° C. to about 1600° C., said heating temperature being maintained for a time from about six minutes to about 24 hours, preferably said heating temperature being maintained for a time from about 30 minutes to about 12 hours, more preferably said heating temperature being maintained for a time from about one hour to about 4 hours.

The ceramics made by the process of Paragraph 0032 may be used in almost any application requiring a ceramic.

Test Methods

Brush Length Test Method
Dynamic light scattering and rheology were used to characterize the brush lengths of polymers grafted from nanoparticle surfaces. Dynamic light scattering determines the radius of hydration ($R_H$) of the entire preceramic polymer grafted nanoparticle. Preceramic polymer grafted nanoparticle brush length is calculated by subtracting the known nanoparticle radius from the total $R_H$. A Zetasizer Malvern Nano ZS series is used to determine the preceramic polymer grafted nanoparticle $R_H$ using a 100 VA He—Ne laser with a 633 nm wavelength and a scattering angle of 175°. ~0.1 mg/ml solutions of preceramic polymer grafted nanoparticles dispersed in toluene must be studied in triplicate. The instrument produces an intensity autocorrelation function that describes the Brownian motion of the particles through the solvent and this is plotted against time (us) showing a characteristic exponential decay that is dependent on particle size. A single exponential fit of this curve reveals a decay exponent equivalent to the diffusion coefficient (D) of the particles through toluene. This diffusion coefficient can be plugged into the Stokes-Einstein equation (1) that relates D to $R_H$. k is the Boltzmann's constant, T is temperature, and η is the viscosity of the solvent (toluene).

$$R_H = \frac{kT}{6\pi\eta D}. \quad (1)$$

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. Production of a Preceramic Polymer Grafted Nanoparticles of Formula 1

A preceramic polymer grafted hairy nanoparticle was produced via the synthesis route below using allyldimethylsilane as the monomer grown off the nanoparticle surface:

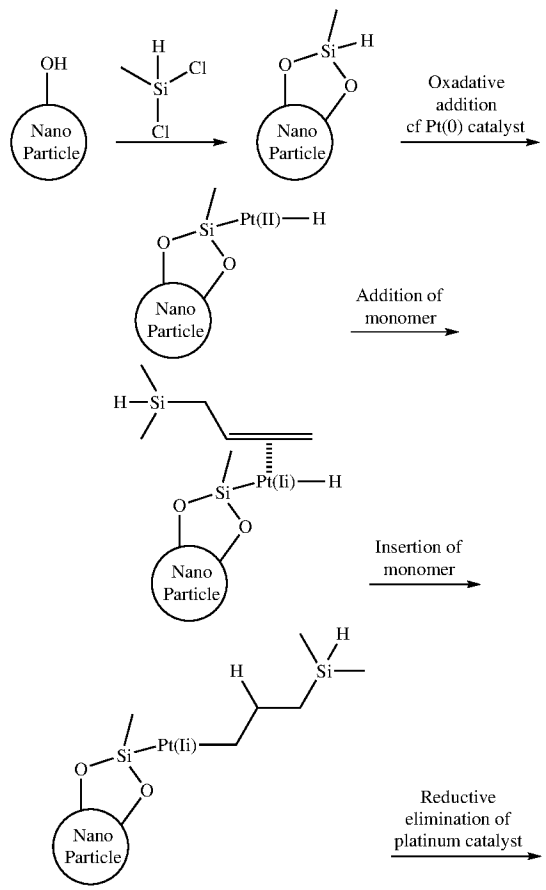

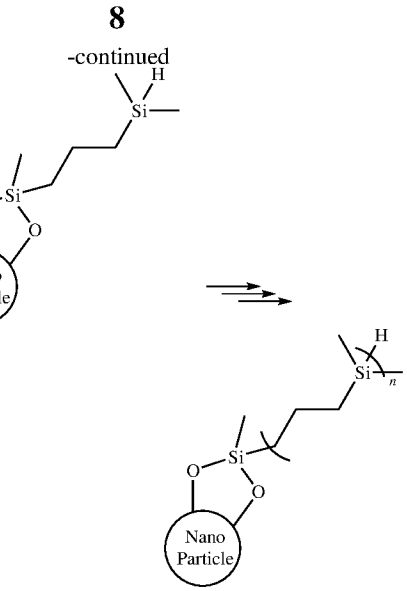

Hydrosilylation was used to graft the preceramic polymer from the surface of a silanized nanoparticle. The catalyst was recycled after each monomer addition, allowing for the sequential growth of polymer off of the particle surface. The brush length was dependent on reaction time, and preceramic polymer grafted nanoparticles with brushes long enough to support favorable rheological properties were synthesized after 72 hours. Such brush lengths were determined in accordance with the test method provided in the Test Methods section of this specification for brush length.

Example 2 Production of a Preceramic Polymer Grafted Nanoparticles

A preceramic polymer grafted nanoparticles is produced according to the synthesis of Example 1 except

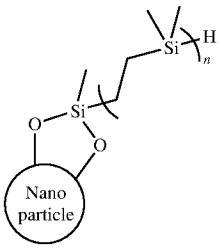

wherein the monomer that is grown from the surface is chosen from a group of organic silanes consisting of alkenyl (vinyl, allyl), with either halogen (chloro) or alkyl (methyl) groups and is substituted for.

Example 3 Production of a Preceramic Polymer Grafted Nanoparticles

A preceramic polymer grafted nanoparticles is produced according to the synthesis of Example 1 except

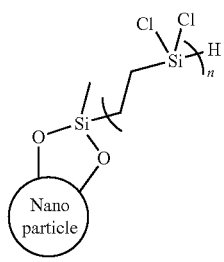

wherein the monomer that is grown from the surface is chosen from a group of organic silanes consisting of alkenyl (vinyl, allyl), with either halogen (chloro) or alkyl (methyl) groups and is substituted for

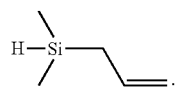

Example 4 Production of a Preceramic Polymer Grafted Nanoparticles

A preceramic polymer grafted nanoparticles is produced according to the synthesis of Example 1 except

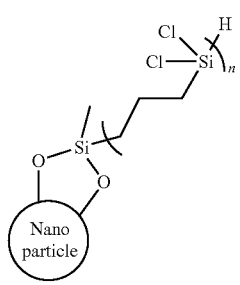

wherein the monomer that is grown from the surface is chosen from a group of organic silanes consisting of alkenyl (vinyl, allyl), with either halogen (chloro) or alkyl (methyl) groups and is substituted for

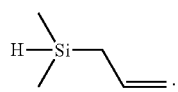

Example 5 Production of a Preceramic Polymer Grafted Nanoparticles

A preceramic polymer grafted nanoparticle is produced according to the synthesis of Example 1 except

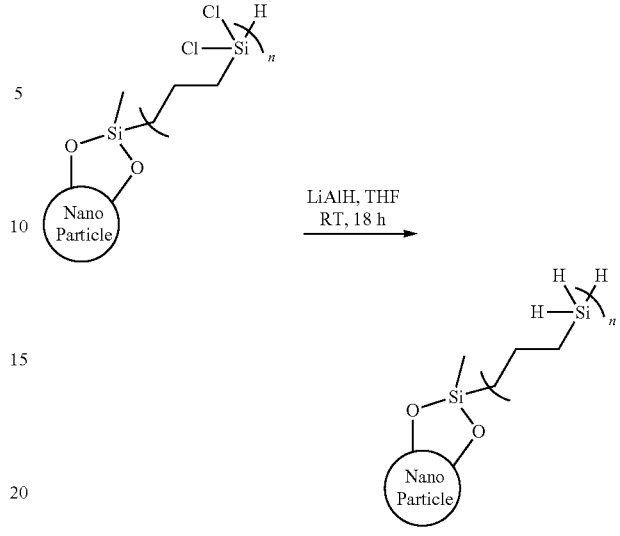

a chlorinated preceramic polymer brush is further reduced with lithium aluminum hydride to give the 1,1-dihydro species.

Example 6 Production of a Preceramic Polymer Grafted Nanoparticles

A preceramic polymer grafted nanoparticle is produced according to the synthesis of Example 1 except

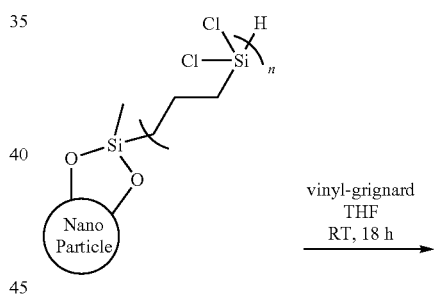

a chlorinated preceramic polymer brush is further reacted with a vinylgrignard to give the 1,1-diallyl species.

Example 7 Production of a Preceramic Polymer Grafted Nanoparticles

A preceramic polymer grafted nanoparticle is produced according to the synthesis of Example 1 except

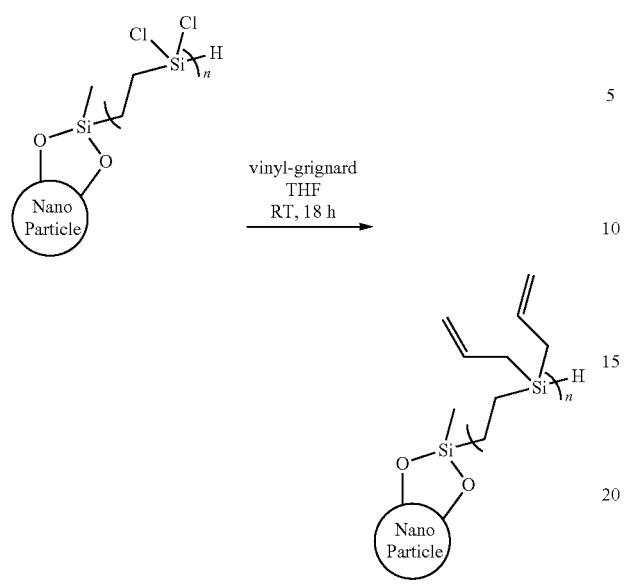

a chlorinated preceramic polymer brush is further reacted with a vinylgrignard to give the 1,1-diallyl species.

Example 8 Production of a Preceramic Polymer Grafted Nanoparticles

A preceramic polymer grafted nanoparticle is produced according to the synthesis of Example 1 except

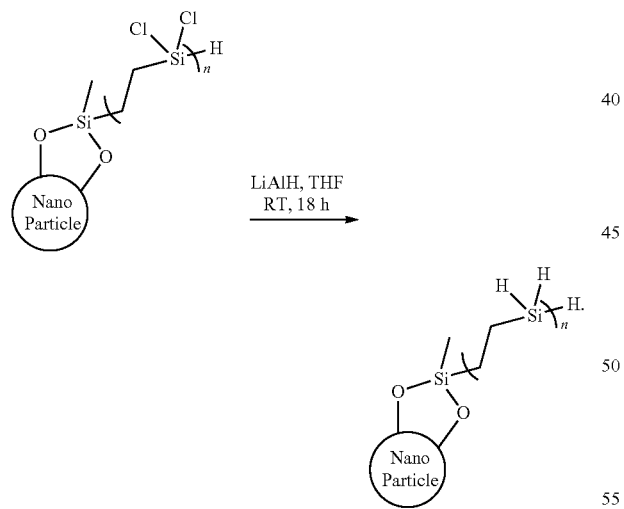

a chlorinated preceramic polymer brush is further reduced with lithium aluminum hydride to give the 1,1-dihydro species.

Example 9 Production of a Preceramic Polymer Grafted Nanoparticles

A preceramic polymer grafted nanoparticle was produced according to the synthesis of Example 9

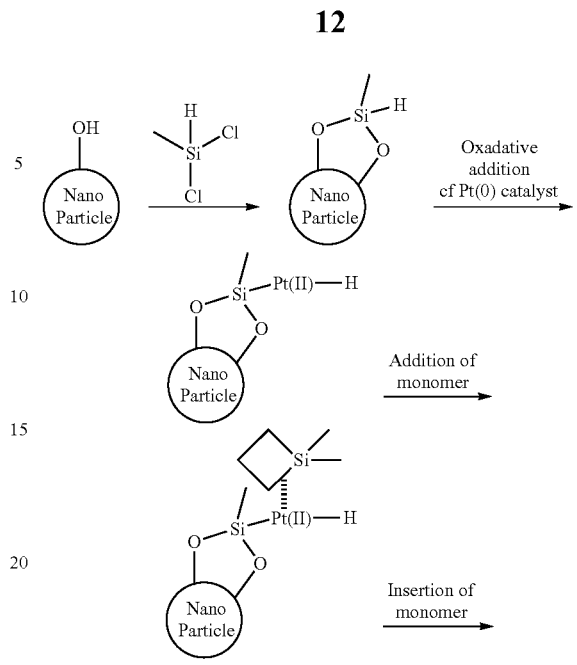

Platinum catalyzed ring opening polymerization if cyclic silanes were used to graft the preceramic polymer from the surface of a silanized nanoparticle. The catalyst was recycled after monomer addition, allowing for the sequential growth of polymer off of the particle surface. The brush length was dependent on reaction time and monomer concentration. Such brush lengths were determined in accordance with the test method provided in the Test Methods section of this specification for brush length.

Example 10 Production of a Preceramic Polymer Grafted Nanoparticles

A preceramic polymer grafted nanoparticle is produced according to the synthesis of Example 10

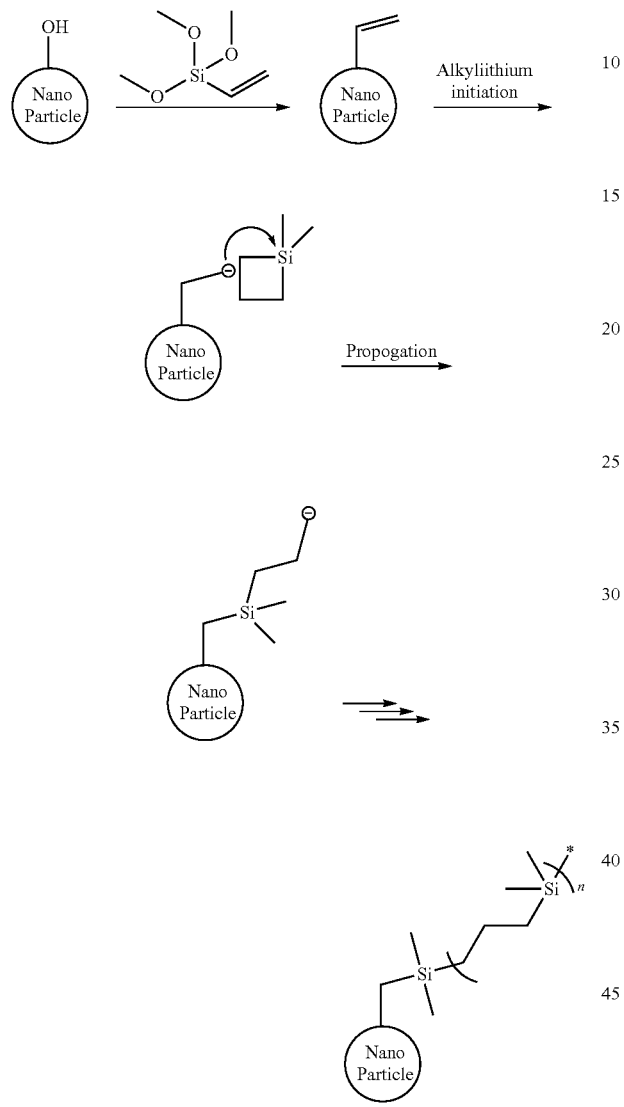

Anionic ring opening polymerization of cyclic silanes is used to graft the preceramic polymer from the surface of a silanized nanoparticle. The catalyst is recycled after each monomer addition, allowing for the sequential growth of polymer off of the particle surface. The brush length is dependent on reaction time and monomer concentration. Such brush lengths are determined in accordance with the test method provided in the Test Methods section of this specification for brush length.

Example 11 Production of a Preceramic Polymer Grafted Nanoparticles

A preceramic polymer grafted nanoparticles is produced according to the synthesis of Example 9 or 10 except

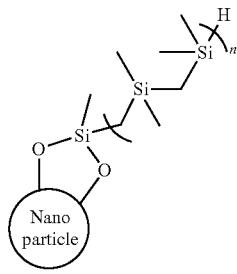

wherein the monomer that is grown from the surface is chosen from a group of organic cyclic silanes consisting of 1,1,3,3-tetramethyl-1,3-disilylcyclobutane and is substituted for

Example 12 Production of a Preceramic Polymer Grafted Nanoparticles

A preceramic polymer grafted nanoparticles is produced according to the synthesis of Example 9 or 10 except

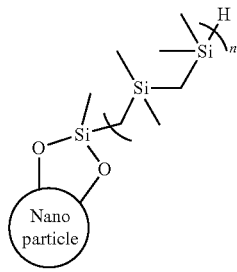

wherein the monomer that is grown from the surface is chosen from a group of organic cyclic silanes consisting of 1,1,3,3-tetramethyl-1,3-disilylcyclobutane and is substituted for

Example 13 Production of a Preceramic Polymer Grafted Nanoparticles

A preceramic polymer grafted nanoparticles is produced according to the synthesis of Example 9 or 10 except

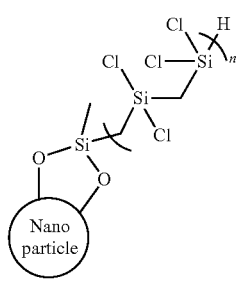

wherein the monomer that is grown from the surface is chosen from a group of organic cyclic silanes consisting of 1,1,3,3-tetrachloro-1,3-disilylcyclobutane and is substituted for

Example 14 Production of a Preceramic Polymer Grafted Nanoparticles

A preceramic polymer grafted nanoparticle is produced according to the synthesis of Example 9 or 10 except

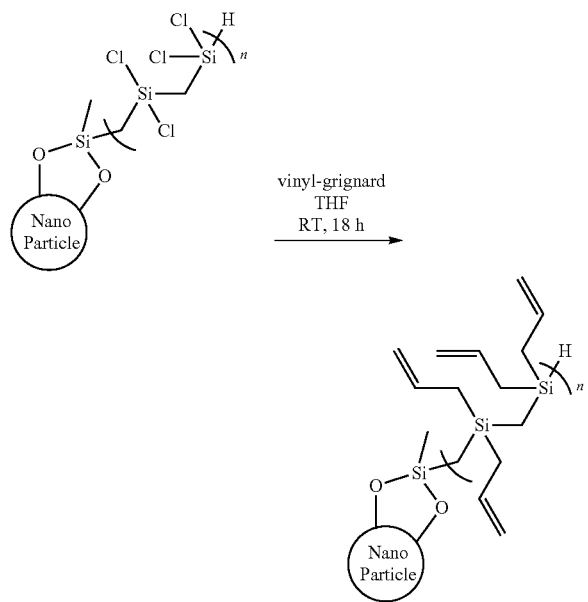

a chlorinated preceramic polymer brush is further reacted with vinylgrignard to give the 1,1,3,3-tetraallyl species.

Example 14 Production of a Preceramic Polymer Grafted Nanoparticles

A preceramic polymer grafted nanoparticle is produced according to the synthesis of Example 9 or 10 except

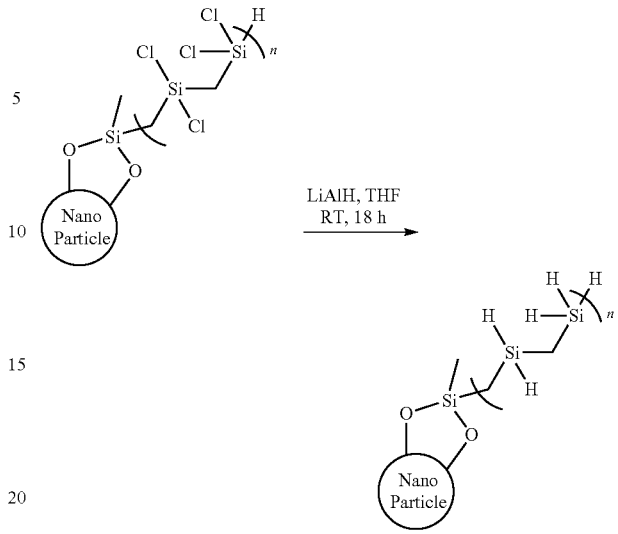

a chlorinated preceramic polymer brush is further reduced with lithium aluminum hydride to give the 1,1,3,3-tetrahydro species.

As will be appreciated by the skilled artisan who is possession of this specification, depending on the length of the reaction and the monomer used to synthesize the HNP, brush lengths can vary. However, the preceramic polymer grafted nanoparticles produced in Applicants' Examples were tested in accordance with applicants' brush length test method and the brush lengths were found to range from 3 nm-15 nm.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A preceramic polymer grafted nanoparticle comprising a core having an outer surface and maximum dimension in any single direction of 1 micron, and a plurality of polymers covalently bound to the outer surface of said core:
   a) said core comprising a ceramic comprising a material selected from the group consisting of Hydrogen, Lithium, Beryllium, Boron, Carbon, Nitrogen, Oxygen, Fluorine, Sodium, Magnesium, Aluminum, Silicon, Phosphorus, Sulfur, Chlorine, Potassium, Calcium, Scandium, Titanium, Vanadium, Chromium, Manganese, Iron, Cobalt, Nickel, Copper, Zinc, Gallium, Germanium, Arsenic, Selenium, Bromine, Strontium, Yttrium, Zirconium, Niobium, Molybdenum, Technetium, Ruthenium, Rhodium, Palladium, Silver, Cadmium, Indium, Tin, Antimony, Tellurium, Iodine, Cesium, Barium, Lanthanum, Cerium, Praseodymium, Neodymium, Promethium, Samarium, Europium, Gadolinium, Terbium, Dysprosium, Holmium, Erbium, Thulium, Ytterbium, Lutetium, Hafnium, Tantalum, Tungsten, Rhenium, Osmium, Iridium, Platinum, Gold, Mercury, Thallium, Lead, Bismuth, Polonium, Radium, Actinium, Thorium, Protactinium, Uranium, Neptunium, Plutonium, Americium, and mixtures thereof, and b) said plurality of polymers comprising a polycarbosilane and said plurality of polymers having an average brush length of from about 1 nanometer to about 50 nanometers and said polycarbosilane is selected from the group consisting of poly(1,1-dimethylpropylsilane), poly(1,1-dichloropropylsilane), poly(1,1-diallylpropylsilane), poly(1,1dihydropropylsilane), poly(1,1-dimethylethylsilane), poly(1,1-dichloroethylsilane), poly(1,1diallylethylsilane), poly(1,1dihydroethylsilane), poly(1,1,3,3-tetramethyl-1,3-disilylbutane), poly(1,1,3,3-tetrachloro-1,3-disilylbutane), poly(1,1,3,3-tetraallyl-1,3-disiylbutane), poly(1,1,3,3-tetrahydro-1,3-disilylbutane), and copolymers of poly(1,1-dimethylpropylsilane), poly(1,1-dimethylethylsilane), poly(1,1-dichloropropylsilane), poly(1,1-dichloroethylsilane), poly(1,1,3,3-tetramethyl-1,3-disilylbutane), poly(1,1,3,3-tetrachloro-1,3-disilylbutane) and mixtures thereof.

2. A preceramic polymer grafted nanoparticle according to claim 1 wherein:
a) said core comprises a nonoxide ceramic and said core has a maximum dimension in any single direction of 100 nanometers; and
b) said plurality of polymers have an average brush length of from about 5 nanometers to about 12 nanometers.

3. A preceramic polymer grafted nanoparticle according to claim 1 wherein said core comprises SiC, ZrC, HfC, $Si_3N_4$, ZrN, HfN, $ZrB_2$, $HfB_2$, and mixtures thereof and said core has a maximum dimension in any single direction of 2 nanometers to 30 nanometers.

4. A material comprising a preceramic polymer grafted nanoparticle according to claim 1, said material being selected from the group consisting of a fiber, a bulk monolithic ceramic, a composite and a resin.

5. An article comprising a material according claim 4, said article being selected from the group consisting of a brake pad, brake rotor, turbine combustor liner, turbine vane, turbine shroud, turbine blade, turbine bladed disc, flap, seal, aeroshell, leading edge, flame holder, exhaust structure, flowpath component, air inlet, compressor blade, isolator, fastener, signal aperture, window, combustion chamber, mixing vessel, nuclear fuel cladding, nuclear fuel coating, cutting tool, ballistic protection armor, heat shield, heat exchanger, particulate filter, metal casting filter, crucible, mirror, heating element, catalyst support, rocket nozzle, high-temperature valve, chemical handling equipment, or furnace support.

6. A finished article comprising a material according to claim 4, finished article being selected from the group consisting of a turbine engine, scramjet, ramjet, combined cycle engine, rotating detonation engine, internal combustion engine, augmenter, rocket engine, automotive brake system, aerospace brake system, high-speed aircraft aeorshell, leading edge, missile, airplane, nuclear reactor, armor protection system, chemical reactor, chemical handling equipment, furnace, filter assembly, cutting tool, window, aperture, telescope, or satellite.

7. A finished article comprising an article according to claim 5, said finished article being selected from the group consisting of a turbine engine, scramjet, ramjet, combined cycle engine, rotating detonation engine, internal combustion engine, augmenter, rocket engine, automotive brake system, aerospace brake system, high-speed aircraft aeorshell, leading edges, missile, airplane, nuclear reactor, armor protection system, chemical reactor, chemical handling equipment, furnace, filter assembly, cutting tool, window, aperture, telescope, or satellite.

8. A method of making a ceramic comprising:
a) crosslinking a mass of preceramic polymer grafted nanoparticle, said mass of preceramic polymer grafted nanoparticle comprising preceramic polymer grafted nanoparticles according to claim 1; and
b) heat treating said crosslinked mass of preceramic polymer grafted nanoparticles in an inert gas or under vacuum, said heating temperature being maintained for a time from about six minutes to about 24 hours.

9. A method of making a ceramic according to claim 8 wherein:
a) said crosslinking comprises heat treating and or chemically treating said mass of preceramic polymer grafted nanoparticles by adding a crosslinker, said inert gases are selected from the group consisting of argon, nitrogen, hydrogen, helium and mixtures thereof, and said vacuum is less than 0.1 Pascal's; and
b) said heat treating comprises heating said crosslinked preceramic polymer grafted nanoparticles to a temperature of from about 600° C. to about 2700° C., said heating temperature is maintained for a time from about 30 minutes to about 12 hours.

10. A method of making a ceramic according to claim 9 wherein said heat treating comprises heating said crosslinked preceramic polymer grafted nanoparticles to a temperature of from about 600° C. to about 2000° C. and said heating temperature is maintained for a time from about one hour to about 4 hours.

11. A method of making a ceramic according to claim 9 wherein said heat treating comprises heating said crosslinked preceramic polymer grafted nanoparticles to a temperature of from about 600° C. to about 1600° C.

* * * * *